June 27, 1933.  J. R. ORELIND  1,915,866

PLOW

Filed June 13, 1929  6 Sheets-Sheet 1

Inventor:
John R. Orelind
By Rector, Hibben, Davis & Macauley
Attys

June 27, 1933.   J. R. ORELIND   1,915,866
PLOW
Filed June 13, 1929   6 Sheets-Sheet 2

Inventor:
John R. Orelind
by Rector, Hibben, Davis, & Macauley
Attys

June 27, 1933. J. R. ORELIND 1,915,866
PLOW
Filed June 13, 1929 6 Sheets-Sheet 4

Inventor:
John R. Orelind
by Rector, Hibben, Davis, ? Macauley
Attys

June 27, 1933.  J. R. ORELIND  1,915,866
PLOW
Filed June 13, 1929  6 Sheets-Sheet 5

Inventor:
John R. Orelind
by Rector, Hibben, Davis, & Macauley
Attys

Patented June 27, 1933

1,915,866

UNITED STATES PATENT OFFICE

JOHN R. ORELIND, OF MOLINE, ILLINOIS, ASSIGNOR TO MINNEAPOLIS-MOLINE POWER IMPLEMENT CO., OF MOLINE, ILLINOIS, A CORPORATION OF DELAWARE

PLOW

Application filed June 13, 1929. Serial No. 370,488

This invention relates to a plow and, while it is illustrated and described in connection with a reversible, two-way tractor plow, it may be applied in some of its aspects to other types of plows as will later appear.

The general object of the invention is to provide an improved, reversible, two-way tractor plow.

A more particular object is to provide an improved automatic control of the height of the ground wheels in a reversible two-way plow so that one of them may run in a furrow and the other on unplowed land in accordance with whether the right or left hand plow bodies are to be used.

Another object is to provide improved draft connections which will be automatically conditioned to properly locate the center line of draft in accordance with whether the right or left hand plows are being used.

Another object is to provide an improved mounting for the ground wheels of a plow which will enable the plow to be turned at a sharp angle when in transport position.

Still another object is to provide improved draft connections for turning a plow sharply.

Another object is to provide draft connections which will hold a plow in position to be backed even though the ground wheels are free to caster in any direction.

Still another object is to provide an improved automatic releasing device which will operate when the plow strikes an obstruction.

Other objects and advantages of the invention will appear from the following specification and drawings.

An embodiment of the invention is shown in the accompanying drawings, in which.

Draft frame

The plow includes a draft frame having two side bars 10 and 11 (Fig. 12) connected together at their forward ends by a bolt 12, said ends being spaced apart slightly by a sleeve 13. A draft bar 14 is pivoted on a pin 15 carried by the sleeve 13, said draft bar being used to connect the plow to the hitch plate 16 of a tractor 17. The side bars 10 and 11 of the draft frame are braced intermediate their ends by a cross member 18 which not only serves to hold the draft bars in position but also acts as a support for other parts of the plow as will hereinafter appear.

The rear ends of the side bars 10 and 11 are inclined inwardly at 19 and 20, the rear ends being held together in spaced relation by a shaft 21. Each end of the shaft 21 is shouldered as illustrated at 22 at the right hand side (Fig. 12) and the ends of the side bars 10 and 11 are held against the shoulders on the shaft by nuts 23 screw threaded onto the ends of said shaft.

Beam structure

Figure 12:
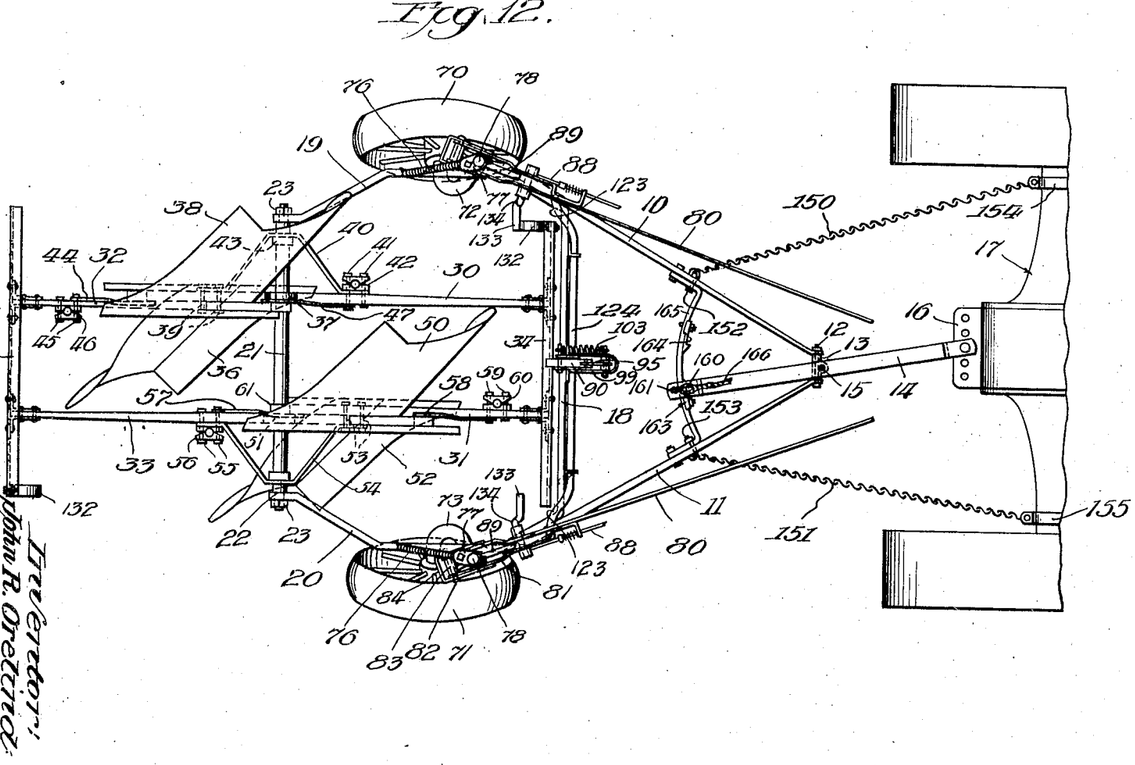
Fig. 12 is a plan view of the plow hitched to a tractor.

Journaled on the shaft 21 to swing about a horizontal axis which is substantially at right angles to the fore and aft or longitudinal axis of the plow, is a beam structure carrying right and left hand plow bodies. In the plow illustrated, this beam structure is made up of four plow beams 30, 31, 32 and 33. The two beams 30 and 31 are connected at their forward ends, as illustrated in Fig. 12, to a cross member 34 in the form of a channel iron. The two beams 32 and 33 are connected at their rear ends, as illustrated in Fig. 12, to a cross member 35 similar to the cross member 4. In each case the cross members are provided with a plurality of holes so that the beams may be spaced apart differently to accommodate different widths of plow bodies. This enables the width of cut to be varied which, as far as known, is a novel feature in two-way plows. In some positions of the plow the cross member 35 occupies the Fig. 12 position of the cross member 34 so that the question of which is the front and which the rear end of the beam structure depends upon the position of the plow but the following description is based on the cross member 34 being at the front.

The beam 30, as illustrated in Fig. 12, is bent downwardly at its rear end and a right hand plow body 36 is removably secured to this bent down end. This beam is journaled for rotation on the shaft 21, an enlarged portion 37 being provided for this purpose.

Figure 10:
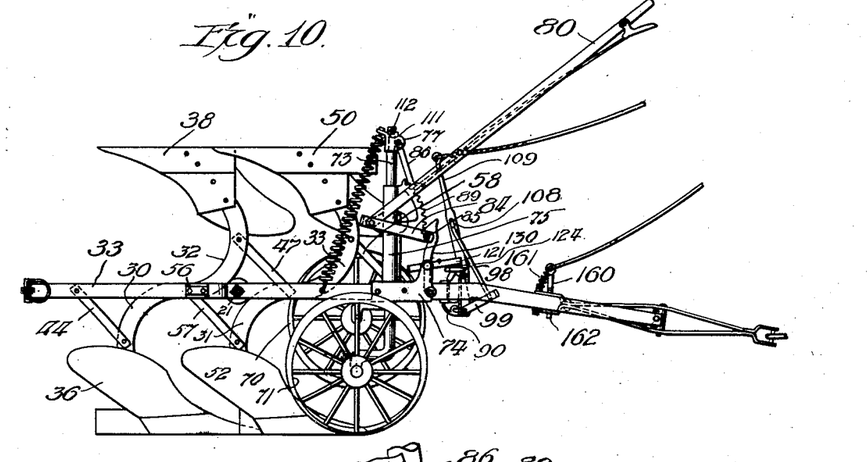
Fig. 10 is a side elevation of the plow in plowing position for throwing soil to the right.

The beam 32, which is the companion of the beam 30, is slightly shorter than beam 30 and it is bent upwardly at its forward end, as illustrated in Fig. 10. This bent up end has a left hand plow body 38 detachably secured to it. The beam 32 is not journaled directly on the shaft 21, as will be clear by reference to Fig. 10, but it is connected to move with the beam 30. The two beams are connected together by bolts 39 (Fig. 12) which also hold in place one end of a V-shaped brace 40, the flattened apex of which is journaled on the shaft 21. The other end of this brace is connected to the beam 30 by bolts 41 which also clamp in place a standard 42 carrying a rolling coulter which, in order to avoid confusion, has not been illustrated. The brace 40 is held against longitudinal movement to the right on shaft 21 by a set screw collar 43. A diagonal brace 44 (Fig. 10) extends between the beam 32 and the downwardly bent end of beam 30, said brace being connected to beam 32 by bolts 45 which also clamp in place a standard 46 for supporting a rolling coulter. A similar diagonal brace 47 extends between the beam 30 and the upwardly bent portion of the beam 32.

The beams 31 and 33 are connected together in the same manner as the beams 30 and 32 except that the beams are reversed. The beam 33 is bent upwardly at its forward end as illustrated in Fig. 12 and this bent up end carries a left hand plow body 50. It has an enlarged portion 51 (Fig. 12) having an opening through which the shaft 21 extends so that the beam 33 is journaled for rotation on the shaft 21. The beam 31 is the short beam in this group and its rear end is bent downwardly to detachably receive a right hand plow body 52. The two beams 31 and 33 are connected together by bolts 53 which also clamp in place one end of a V-shaped brace 54 the apex of which is flattened and journaled on the shaft 21 and the other end of which is bolted to the beam 33 by the bolts 55 which also clamp in place a standard 56 for carrying a rolling coulter (not shown). The bolts 55 also clamp in place a diagonal brace 57 which extends between the beam 33 (Fig. 10) and the downwardly bent end of the beam 31. A similar brace 58 is bolted to the forward end of beam 31 by the bolts 59 which also holds a rolling coulter standard 60 in position. The brace 58 extends between the forward end of beam 31 and the upwardly extending bent end of the beam 33. The V-shaped brace 54 is held against longitudinal movement to the left on the shaft 21 by a collar 61 and it will be noted that this collar, in cooperation with the collar 43, holds the beam structure against longitudinal movement in both directions on the shaft 21.

Figures 1, 2, 3:
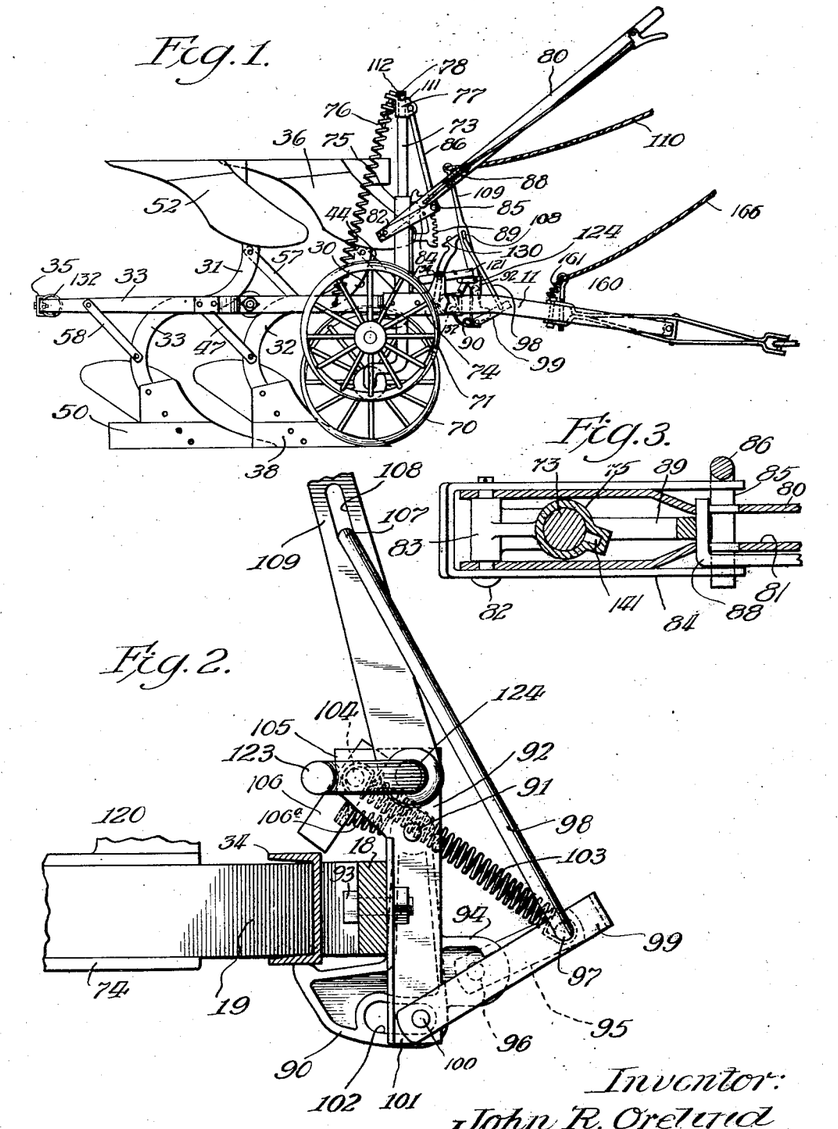
Figure 1 is a side elevation of a plow embodying the invention, the plow being shown in working position for throwing soil to the left.
Fig. 2 is a partial side elevation and section illustrating the latch construction for holding the plow beam structure in place, the parts being shown in normal latched position.
Fig. 3 is a detail section of a portion of the lever construction for adjusting the height of the ground wheels.

From the description above given it should be clear that a beam structure has been provided which carries two right hand and two left hand plow bodies, the entire structure being mounted to rotate about a horizontal axis which is substantially at right angles to the longitudinal axis of the plow. When the two right hand plows are in position for plowing the two left hand plows are on the opposite side of the beam structure and out of operating position as illustrated, for example, in Fig. 10. When the beam structure is reversed the left hand plow bodies are in position for operation and the right hand plow bodies are in non-operating position (Fig. 1). The entire beam structure is quite simple yet very rigid. It is made so that it can be taken apart easily and so that the various plow bottoms can be removed for replacement or repair. The spacing of the beams can be varied to vary the width of cut of the plow and to accommodate different widths of plow bodies. Only one right and left hand plow body may be used, if it is desired to reduce the capacity of the plow, by furnishing other beams 30 and 34 which do not have a bent portion, i. e. they are cut off to the rear of bolts 39 and 53.

Ground wheels and supporting connections for the plow

The plow is supported by two ground wheels 70 and 71 which are journaled on the ends of axles 72 and 73 the axle ends being slightly inclined as illustrated in Fig. 12 so that the wheels will incline slightly inwardly and downwardly and so that they will have a slight inward lead. The axles extend forward slightly and they are then bent upwardly to provide relatively long vertical portions as illustrated, for example, in Fig. 1. The two axles are independent of each other but, inasmuch as the connection between each and the draft frame is alike, only one set of connections will be described, it being understood that the other set is the same except that one set is right handed and the other left handed. The right hand connections have been illustrated and they will be described.

The side bar 11 of the draft frame has a bracket 74 fixed to it and integral with this bracket is an upwardly projecting sleeve 75 in which the vertical portion of the axle 73 is slidably and rotatably mounted. It will be obvious that the weight of the beam structure and the draft frame will tend to move the sleeve 75 downward on the axle 73 so that the parts will tend to occupy the position illustrated in Fig. 1. Counteracting this tendency for the purpose of making it easier to lift the plow is a spring 76 connected at its lower end to the side bar 11 and at its upper end to a sleeve 77 which is slidably and rotatably mounted on the reduced end 78 of the axle 73.

The axles 72 and 73 and their wheels 70 and 71 may be adjusted to different heights relative to the draft frame by means of hand levers 80 (Figs. 1 and 12) of which only the right hand one will be described. The rear end of the lever 80 has a spaced side piece 81 (Figs. 3 and 12) fixed to it and the end of the lever and of the side piece are pivoted by a pivot pin 82 to a bracket 83 extending rearward from sleeve 75. A U-shaped member 84 is also pivoted to the pin 82, the arms of this member extending forward on each side of sleeve 75 and being pivoted at their forward ends to the laterally bent end 85 of a link 86. This link extends upward and its upper end is pivoted to the sleeve 77. The hand lever 80 carries a latch 88 operating over a toothed sector 89 formed integral with the sleeve 75. Assuming the parts are in the position of Fig. 1, if pressure is brought to bear on the outer end of the lever 80 after the latch 89 has been released the lever 80 will contact the bent end 85 of link 86 which forms a fulcrum since the upper end of link 86 is held against downward movement by the engagement of sleeve 77 with the shoulder on the axle 73. Accordingly, the rear end of lever 80 will be forced upward and since it is pivoted to the bracket 83 on sleeve 75 the sleeve 75 will be raised to raise the frame relative to the wheel. The spring 76 helps in this movement. Reverse movement of lever 80 tends to lower the plow.

Automatic reversing and raising of the plow and controlling connections therefor The plow is automatically raised to transport position as an incident to the reversal thereof and it is held raised while the plow is being turned in the field to position it for plowing the next furrow.

Figure 9:
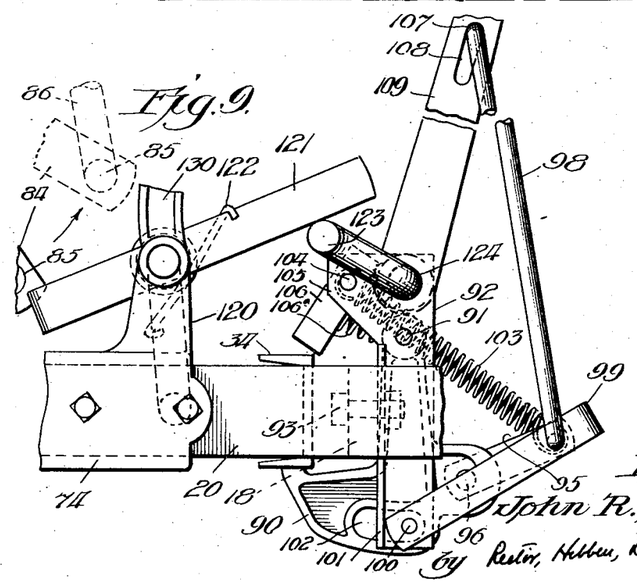
Fig. 9 is a partial side elevation and section of the latch shown in Fig. 7, the parts being shown in the position they occupy when the latch is tripped.

The beam structure carrying the plow bodies is normally latched against rotation relative to the draft frame by a latch 90 (Fig. 2) having a nose engaging the underside of the cross channel 34 of the beam structure. This latch is pivoted at 91 to a bracket 92 bolted to the cross member 18 of the draft frame by means of bolt 93 or the like. The forward end of the latch 90 has a projection 94 to which one end of a link 95 is pivoted by pin 96. The other end of link 95 is journaled on the laterally bent end 97 of a tripping rod 98. The laterally bent end 97 of the rod 98 is pivoted in the forward end of a U-shaped member 99 whose arms project rearwardly astride the latch 90, the rear ends of said yoke arms being pivoted by a pin 100 to a downwardly projecting portion 101 of the bracket 92. The latch 90 is provided with a slot 102 to permit it to swing relative to the pin 100. One end of a spring 103 is connected to the laterally bent end 97 of the rod 98, the other end of said spring being connected to a pin 104 carried by the ears 105 of the bracket 92. Pivoted on the pin 104 is a pass-by pawl or latch 106, the purpose of which will be later described, said latch being urged to the position of Fig. 2 by a spring 106ª. The upper end of the tripping rod 98 has a laterally bent end 107 operating in a slot 108 in a trip lever 109 which may be rocked forward by pulling on a cable or a rope 110 connected to is upper end (Fig. 1), and extending forward to a position where it may be grasped by an operator on a tractor. The spring 103 returns the lever to its Fig. 9 position when the rope is released.

Figure 4:
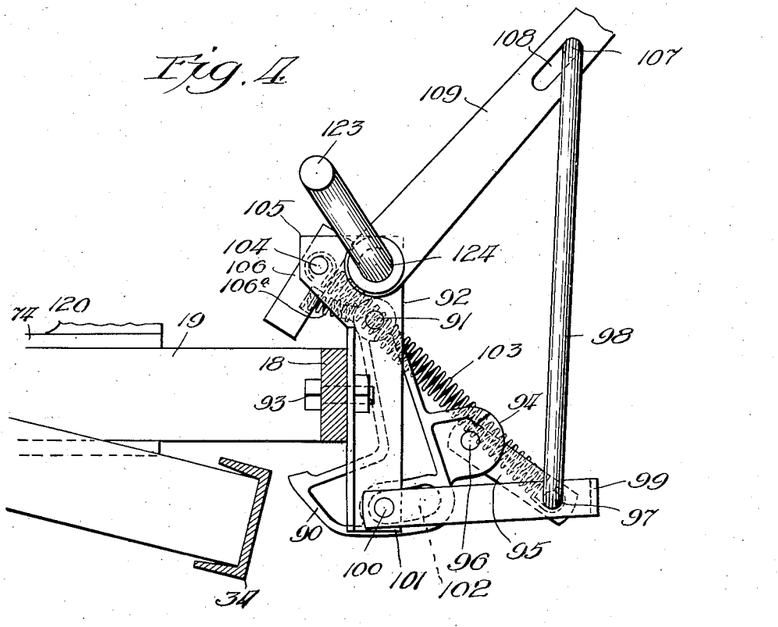
Fig. 4 is a partial side elevation and section similar to Fig. 2 with the parts in the position they occupy with the latch tripped to release the beam structure.

When the parts are in the position illustrated in Fig. 2 the beam structure is latched against rotation relative to the draft frame, but when the rope 110 is pulled forward so as to pull the lever 109 to the position of Fig. 4, the latch 90 is rocked counterclockwise to release the beam structure. During the first part of the movement of the lever 109 the tripping rod 98 is not moved because the laterally bent end 107 of the latter moves in the slot 108 but, after said lever 109 has moved a certain distance the end 107 of the rod 98 contacts the end of slot 108 whereupon rod 98 is thrust downwardly thereby rocking the member 99 clockwise. This swings the link 95 clockwise also and said latter link is given a lateral or forward movement which swings the latch 90 to the tripping position of Fig. 4.

When the beam structure is released as above described while the plow is moving forward, the resistance of the ground on the plow bodies causes the beam structure to be turned relative to the draft frame by the forward movement of the plow. As it turns the cross channel 34, assuming that this channel is in the forward position, strikes the ground and forms a fulcrum on which the beam structure turns over. During its rotation the structure moves through the position of Fig. 5. The distance between the shaft 21 on which the beam structure is pivoted and the end of the beam structure, that is, the cross channel 34, is greater than the distance between the draft frame and the ground when the plows are in working position and, hence, as the beam structure turns to the position of Fig. 5 it raises the frame relative to the ground wheels. The ground wheels do not move upwardly with the frame owing to the fact that they are slidably mounted in the sleeves 75 and are held downwardly by their own weight assisted by the springs 76.

As the draft frame is raised upwardly relative to the ground wheels, the sleeves 75 with their pivots 82 move upward also. Confining the description to only one side, this carries the rear end of the U-shaped member 84 upward but the forward end of this member cannot move upward owing to the fact that the forward end is pivoted to the end of the link 86 which, in turn, is pivoted to the sleeve 77. The sleeve 77 can move upward only a limited distance, namely, until the bottom of slots 111 engage the ends of the pin 112 in the end of axle 73. The result is that the member 84 is swung from the position of Fig. 1 to that of Fig. 5.

Figure 7:
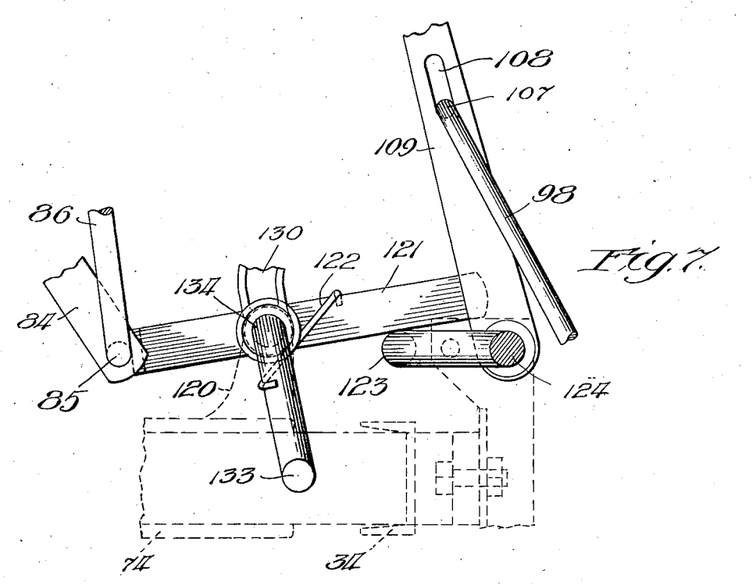
Fig. 7 is a partial side elevation and section showing the latch construction for holding the plow in transport position.

Pivoted on an extension 120 of the bracket 74 is a U-shaped latch 121 (Fig. 7) urged clockwise by a spring 122 which surrounds the pivot on which the latch is mounted, one end of the spring engaging the latch and the other end another member described later. There is one of these latches 121 on each side of the draft frame but since they both operate in the same manner only one will be described. The latch 121 is limited in its movement in a clockwise direction by the crank end 123 of a crank shaft 124 (Fig. 12) which is fixed to the tripping lever 109.

When the draft frame is moved upwardly during the raising and reversal of the plow as heretofore explained, the latch 121 moves with it and the rear of the latch passes the laterally bent end 85 of the link 86, the spring 122 yielding to permit this movement. However, when the frame starts to move downwardly again, that is, slightly after it has passed its Fig. 5 position, the base of the U-shaped latch 121 engages the laterally bent end 85 of the link 86 and stops downward movement of the frame, the parts being held in the position illustrated in Figs. 6 and 7, it being understood that the frame is held on both sides.

Figure 5:
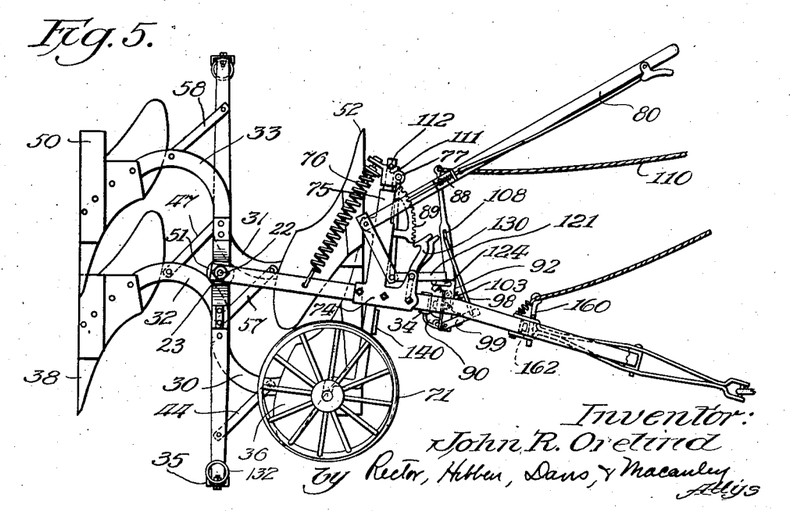
Fig. 5 is a side elevation of the plow showing the parts in the position they occupy as the plow is being reversed and raised.
Figure 6:
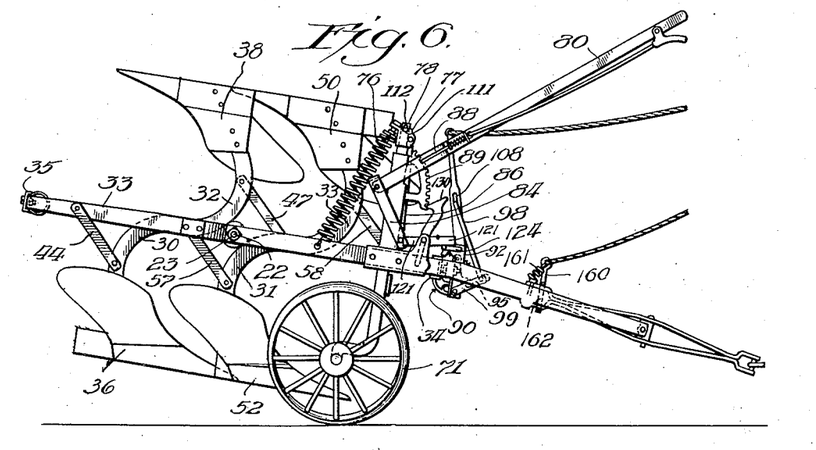
Fig. 6 is a side elevation and section of the plow showing the parts in the position they occupy after the plow has been reversed and raised to transport position.

After the beam structure has moved past its Fig. 5 position and been latched in raised position as above described, further forward movement of the plow causes the beam structure to continue to rotate clockwise owing to the forward movement of the plow and to the momentum that has been given to the beam structure. The result is that the beam structure continues to turn until the cross channel 35 reaches the position of the beam 34 illustrated in Fig. 2. As the cross channel 35 moves into the Fig. 2 position it passes the passby latch 106 which yields to permit the cross member to pass but, as soon as said member has passed, this latch snaps to the position of Fig. 2 to prevent reverse movement of the beam structure.

In this manner the beam structure is automatically reversed by power derived from forward movement of the plow, the left hand plow bodies being in position for operation instead of the right hand but the plow being raised to transport position. It will be understood that this automatic reversal and raising of the plow takes place quite quickly after the rope 110 is pulled so that the plow is raised from the ground and turned to reverse position during a short forward movement. After this takes place the plow may be turned at the end of the furrow to go back across the field to plow a furrow with the soil thrown in the opposite direction. In order to put the plow bodies in working position the plow must then be lowered.

The plow is lowered to working position by a short jerk on the rope 110 which pulls the lever 109 forward far enough to rock the crank 124 far enough to trip the latches 121, this action occurring prior to the time that the laterally bent end 107 of the rod 98 reaches the top of the slot 108. When the crank 124 is rocked clockwise from the position of Fig. 7 to that of Fig. 9 the latches 121 are rocked counterclockwise thereby releasing the links 86. This permits the draft frame to drop by gravity, the downward movement of the frame being limited, except as hereinafter explained, by engagement of the lateral ends 85 of links 86 with the under sides of levers 80 as shown in Fig. 1. This lowers the plow to working position without releasing the beam structure for rotation and this result is accomplished by the same controlling means as is used to release the beam structure, one short pull releasing the plow to permit it to be lowered and a longer and harder pull releasing the beam structure.

When the rope 110 is released the lever 109 returns to its normal position under the influence of spring 103 aided during the latter part of the return movement of the lever by the action of spring 122 on latch 121 and crank axle 123, the latter being attached to lever 109.

*Automatic control of height of ground wheels*

It will be understood that, when the plow is being used, one of the wheels must run in a furrow and the other on unplowed ground which may be anywhere from 3 to 10 inches above the bottom of the furrow. Also, when the plow is reversed, it is necessary for the wheel that previously ran in the furrow to now run on unplowed ground whereas the wheel that previously was running on unplowed ground must now run in the furrow. This requires a reversal of the height of the wheels relative to the plow when the plow is reversed. This reversal is taken care of automatically in the following manner.

Figure 11:
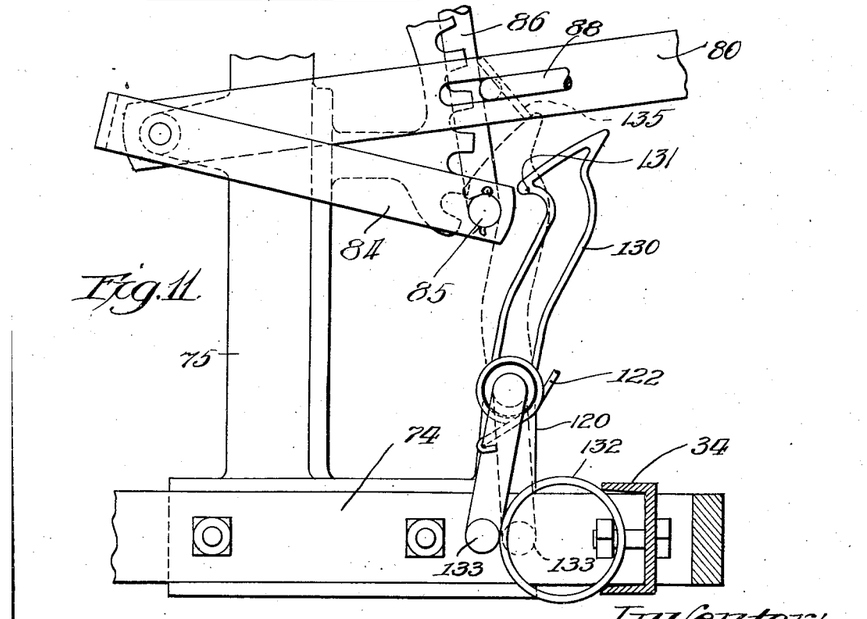
Fig. 11 is a partial side elevation and section of one of the latches that control the height of the ground wheels.

Pivoted on the brackets 120 are latches 130 there being two of these latches, one on each side of the frame, both latches being alike and only one being described. The latch 130 is urged in a counterclockwise direction by the spring 122 that also urges the latch 121 clockwise, the counterclockwise movement of the latch 130 being limited by engagement with the face of toothed sector 89. The upper end of the latch 130 has a hooked shoulder 131 adapted to engage the laterally bent end 85 of the link 86. As the draft frame moves downwardly when released, or as the wheel 71 with its axle 73 moves upward relative to the frame, the U-shaped member 84 with the link 86 tends to swing upwardly from the position of Fig. 6 toward the position of Fig. 1 and, except for the action of the latch 130 presently to be explained, the link would move up until it engaged the lever 80 as illustrated in Fig. 1. However, when the latch 130 is in the dotted line position of Fig. 11, the hooked shoulder 131 catches the lateral end 85 of link 86 and arrests it before the wheel has been permitted to move to its highest position, the arrested position of the parts being illustrated in Fig. 10. The latch is mounted to arrest the wheel of its respective axle at such a position that the bottom of the wheel is at the same level as the bottom of the plow shares, to permit the wheel to run in the furrow. This distance can, of course, be varied by varying the position of lever 80.

Both of the latches 130 are urged in a direction to catch their links 86 as the plow is lowered but these latches are alternately disabled by the beam structure which carries circular tripping rings 132 that are mounted on diagonally opposite corners of the beam structure as illustrated in Fig. 12. When one of these rings engages the cranked end 133 of the shaft 134 carrying the corresponding latch 130, it moves the latch from the dotted line to the full line position of Fig. 11 thereby disabling the latch and permitting the link 86 to move past it to the Fig. 1 position. Only one of the latches 130 is disabled at a time hence, when the plow is lowered, one of the wheels will be permitted to slide up relative to the frame to run on the unplowed ground while the other one is arrested to run in the bottom of the furrow. The control of the wheels is alternate, that is, the latch which is disabled in one position of the plow will be enabled in the next or reverse position of the plow. For example, when the right hand plows are in position for operation and the plow is lowered the right hand wheel will be arrested while the left hand wheel will be allowed to move up to run on the unplowed land. When the plow is reversed so that the left hand plow bodies are in position for operation and the plow is lowered, the left hand wheel will be arrested and the left hand wheel will be allowed to move up to run on unplowed ground. The height of the wheels is thus automatically controlled by the position of the beam structure and plow bodies and the operator need pay no attention to them. All he has to do is to pick and release the rope 110 whereupon the plow will be automatically reversed and raised to transport position. As soon as he has turned the plow in the field to go back across the field he gives the rope another short jerk which lowers the plow and the height of the respective ground wheels is automatically controlled in accordance with whether the right or left hand plows are to be used for plowing.

In opening a furrow in unplowed land, both ground wheels must run on the same level, in which event the wheel that is arrested must be released. This can be done by releasing the appropriate latch 130 by hand but a novel and more convenient means has been provided in the form of an angle plate 135 (Fig. 11) on the lever 80, there being a plate 135 on each lever. This plate is positioned so that by releasing the latch 88 and moving lever 80 downward, the plate will strike latch 130 and release it.

*Automatic release*

It often happens that, while plowing, the plow bodies will strike an obstruction such as a rock, tree stump or the like, which, unless some provision is made to prevent it, may cause the plow to be damaged owing to the heavy draft pull exerted by a tractor. The present invention makes provision for accomplishing this result without requiring the addition of any special parts.

Referring to Fig. 2 it will be observed that the link 95 and the member 99 constitute a toggle, the three pivot points being 100, 96 and 99. This toggle is not quite in straight position but very nearly so and it is urged toward straight position by the spring 103. When an obstruction is encountered by the plow bodies the tendency is for the beam structure to turn relative to the draft frame, the beam structure exerting a pressure on the rear end of the latch 90. For ordinary operation this pressure is not enough to force the latch out of its Fig. 2 position but, when an obstruction is encountered, the pressure on the latch 90 increases and, if this pressure is great enough, the toggle above mentioned will be broken and the beam structure released. The degree of resistance at which the toggle will release can, of course, be varied by varying the strength of the spring 103.

Should the toggle be broken as above explained the beam structure turns relative to the draft frame and the plows are raised out of the ground to transport position so that they ride over the obstruction without damage to the plow. This, of course, reverses the plow but the operator can get the plow into correct position again by pulling on the rope 110 to again reverse the plow. It may be necessary to back the plow slightly though ordinarily this is not necessary as it is not possible, in any event, on account of the obstruction, to start at the same place where the plow left the ground.

This automatic release has several very distinct advantages among which may be mentioned that the release is always kept in good condition owing to the fact that the parts which make it up are operated at the end of each furrow and therefore do not become rusted or stuck together as often happens with automatic releases that are constructed to give way under a given strain but which are often not operated for long periods of time owing to the fact that the plow encounters no obstruction. An automatic release that is seldom used may easily become rusted and stuck together so that it will not release at the proper point and may not release at all. The present construction avoids this difficulty by making use of parts which are frequently operated and therefore in good working condition.

Another advantage is that the plow is automatically raised out of the ground as it is released. Many automatic releases simply allow one part of the plow to move relative to the other but the plow still remains stuck in the ground against the obstruction and it is very difficult to move. For example, it is sometimes impossible to rase the plow by a forward movement and it is difficult to back it while the plow bodies are in the ground. The present construction automatically raises the plow bodies out of the ground to transport position thereby making it unnecessary to raise the plow by hand or to back it while the plow bodies are in the ground. Furthermore, with the plow raised in transport position it may be easily maneuvered into the proper position to start working again. Also, since no parts are moved relative to another which require readjustment by hand such as is the case where relief pins of various kinds are used, the operator need do nothing except to again reverse his plow and start operations.

Another important advantage is that the blow delivered to the plow by the striking of the obstruction is greatly lessened owing to the fact that the forward movement of the draft frame and the wheels is not arrested as the plow strikes the obstruction. These parts continue to move forward the only action being that the beam structure is arrested slightly but as soon as it is stopped it starts to turn and the plow is raised to transport position. This greatly lessens the strain on the plow as against a construction where, as soon as an obstruction is encountered, the entire plow is stopped with a heavy jerk.

Another advantage is that a minimum number of parts is used, that is, the automatic release is obtained by the use of the same parts that function to release the beam structure in the reversal of the plow. This simplifies the construction and decreases costs.

*Sharp angle turning and backing*

When two-way plows are used they are often not pulled across the end of the field from one furrow to another furrow at considerable distance from the first. Instead they are often started back on a reverse furrow immediately adjacent the furrow that has just been plowed. This requires a sharp turning of the plow for the best operation. Such turns are very sharp when made by tractors of the caterpillar type that may be turned around substantially on the spot on which they are resting.

Each of the vertical portions of the axles 70 and 71 has keys 140 thereon (Fig. 8) which, when the plow is lowered in working position, occupy slots 141 in the sleeves 75. The axles are thus held against rotation and the wheels are held in positions substantially parallel to the forward movement of the plow.

Figure 8:
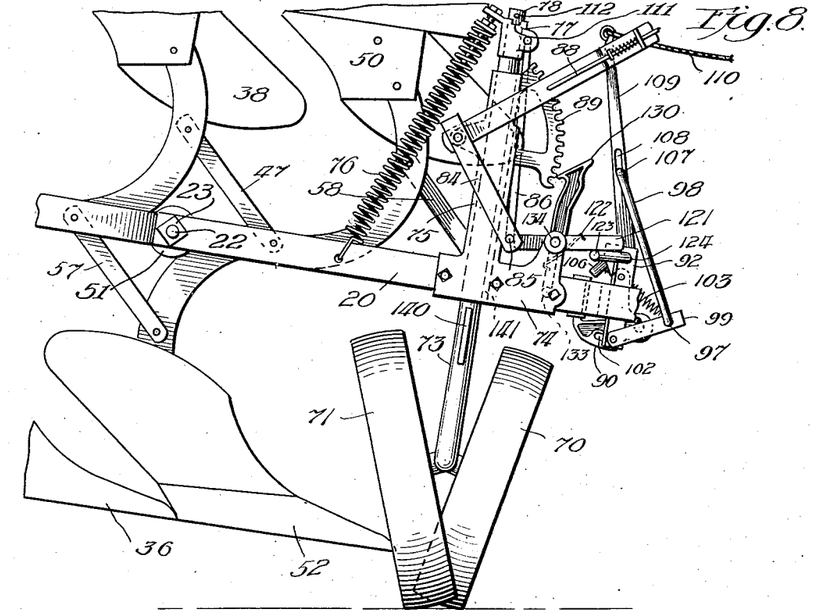
Fig. 8 is a partial side elevation similar to Fig. 6 showing how the ground wheels may turn sharply to enable the plow to be turned at the end of a furrow.

When the plow is raised to the position of Fig. 8 the sleeves 75 are raised above the keys 140 which permits the axles to swivel freely about their vertical axes. For example, as the plow is turned, the wheels may move to the position of Fig. 8 and, since the plow is supported on two wheels, this permits the plow to be turned around practically on the spot on which it is resting. This construction has a very great advantage over the ordinary construction which requires a considerable radius for turning of the plow.

After the plow has been turned, the wheels tend to adjust themselves parallel to the forward movement of the plow and, as the plow is lowered, the keys 140 enter the keyways 141 in the sleeves 75 and the wheels are locked in positions parallel to the direction in which the plow is moving. Should it happen that the keys 140 do not exactly register with the slots 141 when the plow is lowered, the forward movement of the plow will tend to drag the wheels into the proper position immediately and the keys will then move into the slots. In order to prevent the axles from turning as the plow is raised the sleeve 77 has a slight movement on the reduced end of the axle 73. As the frame is raised to the Fig. 5 position the slots 111 of sleeve 77 move over the ends of pin 112 in axle 73 thereby locking the wheels against turning until the plow is lowered slightly to its Fig. 6 position which frees the axle.

In order to assist in sharply turning the plow after the wheels have been freed to caster, special connections have been provided in the form of flexible chains 150 and 151. There is one of these chains on each side of the plow, the chain 150 being connected by a bolt 152 to the side bar 10 and the chain 151 being connected by a bolt 153 to the side bar 11. These chains extend forward and are adapted to be connected at their forward ends to appropriate hitch rings 154 and 155 on the tractor 17.

When the tractor is turned sharply, for example, if it is turned to the right in Fig. 12, the chain 151 becomes loose while the chain 150 becomes taut and, as the tractor turns, the pull on the chain 150 swings the plow around much more sharply than if the draft were exerted only through the draft bar 14.

This construction also aids in keeping the plow in proper position as it is being drawn forward but it has a still more important function when the plow is being backed while in transport position. It will be appreciated that when the plow is in transport position the wheels 70 and 71 are free to caster and, if the backward push were through the draft bar 14 only, the plow would be free to go in most any direction. However, with the construction above described, when the plow tends to swerve from one side to the other the chain on the opposite side becomes taut and the plow is held substantially in line with the tractor so that it may be backed freely without fear of having it cramp against the tractor.

*Automatic adjustment of draft line*

When tractors of different width are used, one wheel of which should run in the furrow, the line of draft may be to one side of the center line of the tractor, the side on which the offset occurs changing for each reversal from right to left hand plowing. Also with plow bodies which plow different widths of furrow the line of draft changes. Also the right hand plow bodies in a reversible plow of the character described are not immediately above the left hand plow bodies as will be clear by reference to Fig. 12. As will be observed from Fig. 12, the longitudinal center line of resistance of one set of plow bodies is on one side of the longitudinal center line of the plow and the longitudinal center line of resistance of the other set of plow bodies is on the opposite side of the longitudinal center line of the plow. Accordingly, when the right plow bodies are in plowing position the center line of draft for the two plows is different than when the two left hand plows are in plowing position. All these factors make it necessary to shift the draft connections each time the plow is reversed and this is often done by hand. In the present construction the shift takes place automatically under the following conditions.

By referring to Fig. 12 it will be observed that the draft bar 14 is pivoted intermediate its ends on the pivot 15 carried by the sleeve 13 on the draft frame. The forward end of the draft bar 14 is connected to the hitchplate 16 of the tractor while the rear end carries a latch 160 urged to latching position by a spring 161. The latch engages with the hook-shaped latch plate 163 and 164 carried by an arcuate cross member 165 supported by the side bars 10 and 11 of the draft frame. The latch 160 may be released by a forward pull on a rope or cable 166 which extends forward to a position where the operator on the tractor may readily grasp it.

When the tractor is moving forward with the right hand plows in position the draft bar 14 occupies the position illustrated in Fig. 12 which shifts the draft line to the proper position for the right hand plows. When the tractor is turning to the right after the plow has been reversed so that the left hand plows are in position for operation the operator jerks the rope 166 and releases the latch 160. Then as the tractor turns to the right the draft bar 14 swings clockwise as viewed in Fig. 12 until the nose of the latch 160 snaps behind the latch plate 163 whereupon the draft bar is latched in its new position, that is, the position for the left-hand plow bodies. Such action takes place without requiring any manipulation on the part of the operator except releasing of the latch 160 through a jerk of rope 166. The reverse movement of the draft bar takes place when the tractor reaches the end of the next furrow and the tractor is turned to the left.

It is to be understood that the construction shown is for purposes of illustration only and that variations may be made in it without departing from the spirit and scope of the invention as defined by the appended claims.

I claim:

1. A two-way plow having a beam structure carrying right and left hand plow bodies, said beam structure being reversible to alternately place said right and left hand plow bodies in working position, a draft bar adapted to be connected at one end to a tractor and to be adjustably attached to said plow so that it may be positioned to place the line of draft coincident with the longitudinal center of resistance of the plow bodies that are in working position, releasable latching means for holding said bar in said position, said bar being mounted so that, when released, it will be automatically shifted by the tractor as the latter turns to turn the plow to position for use of the other set of plow bodies, to a position to change the line of draft to coincide with the horizontal center line of resistance of the said other set of plow bodies, said latching means acting to latch the bar in its second position.

2. A plow having a beam structure carrying plow bodies, ground wheels for supporting said beam structure, a draft bar pivoted between its ends to the plow to swing about a vertical axis and adapted to be connected at its front end to a tractor, a latching device for latching the rear end of the bar in different positions, and means for releasing the latch to permit the bar to swing on its pivot whereby the position of the bar relative to the beam structure is automatically changed by the turning movement of the tractor, said latching device acting to automatically latch the bar in the position to which it is turned.

3. A plow having a beam structure carrying plow bodies, ground wheels for supporting the beam structure, a draft bar adapted to be connected at one end to a tractor and pivoted to the plow to swing about a vertical axis, flexible connections attached to the beam structure on each side of the draft bar and adapted to be connected to a tractor whereby, when the tractor is steered to the right or left the flexible connection on the left or right will become taut to quickly turn the plow.

4. A plow having a beam structure carrying plow bodies, ground wheels for supporting the beam structure, said beam structure being movable from working to transport position and vice versa, connections between the ground wheels and the beam structure for holding the ground wheels in planes parallel to the longitudinal axis of the plow when the plow is in working position but permitting said wheels to swivel freely about vertical axes when the plow is in transport position, a draft bar connected to said beam structure to swing about a vertical axis, flexible connections attached to said beam on each side of said draft bar and adapted to be attached to a tractor whereby as the tractor is turned the plow will be quickly guided in the direction that the tractor is steered.

5. A plow having a beam structure carrying plow bodies, ground wheels for supporting the beam structure, draft connections attached to said beam structure for pulling the plow, said beam structure being mounted so as to be turnable in the direction of movement of the plow, and means acting automatically, when the plow bodies strike an obstruction that puts a resistance on said bodies in excess of a predetermined value to turn said plow bodies over said obstruction and to raise them to transport position.

6. A reversible, two-way plow having a beam structure carrying right and left hand plow bodies, ground wheels for supporting said beam structure, each of said ground wheels being adapted to occupy a raised position to run on unplowed ground or a lowered position to run in a furrow, means for reversing the position of said beam structure and during such reversal raising the beam structure relative to the ground wheels, and means controlled by said beam structure in accordance with whether the right or left hand plow bodies are in position for operation acting automatically as the beam structure is lowered to determine the raised or lowered position of the respective ground wheels relative to the beam structure in the working position of the plow to thereby position the proper wheel to run in a furrow and the other on unplowed land.

7. A reversible, two-way plow having a beam structure carrying right and left hand plow bodies, ground wheels for supporting said beam structure, each of said ground wheels being adapted to occupy a raised position to run on unplowed ground or a lowered position to run in a furrow, means for reversing said beam structure and simultaneously raising it relative to said ground wheels, latching means for holding the beam structure in raised position, means for releasing said latching means to permit the beam structure to move downward relative to the ground wheels, and means controlled by said beam structure in accordance with whether the right or left hand plow bodies are in position for operation acting automatically as the beam structure is lowered to determine the raised or lowered position of the respective ground wheels in the working position of the plow.

8. A reversible plow having a draft frame, ground wheels for supporting said frame, said wheels being vertically movable relative to said frame, each of said wheels being adapted to occupy a raised position to travel on unplowed ground or a lowered position to travel in a furrow, a beam structure carrying right and left plow bodies, said beam structure being pivoted to said frame so that it may be rotated about a horizontal axis at right angles to the longitudinal axis of the plow to position either said right or said left hand plow bodies for operation, means actuated by forward movement of said plow for rotating said beam structure to reverse it, and means controlled by said beam structure for automatically determining the raised or lowered position of the respective ground wheels relative to said draft frame in accordance with whether said right or left hand plow bodies are in position for operation.

9. A reversible plow having a draft frame, ground wheels for supporting said frame, said wheels being movable up and down relative to said frame, each of said wheels being adapted to occupy a raised position to travel on unplowed ground or a lowered position to travel in a furrow, a beam structure carrying right and left hand plow bodies, said beam structure being pivoted to said frame to revolve about a horizontal axis at right angles to the longitudinal axis of the plow, releasable means normally holding said beam structure against rotation, said beam structure being constructed and mounted so that when released it will be automatically rotated to reverse position by forward movement of the plow and will raise said frame relative to said ground wheels, and means controlled by said beam structure in accordance with whether the right or left hand plow bodies are in position for operation acting automatically as the frame is again lowered to determine the raised or lowered position of the respective ground wheels relative to the draft frame in the working position of the plow.

10. A reversible, two-way plow having a draft frame, ground wheels for supporting said frame, said wheels being vertically movable relative to said frame independently of each other, each of said wheels being adapted to occupy a raised position to travel on unplowed ground or a lowered position to travel in a furrow, a beam structure carrying right and left hand plow bodies, said beam structure being pivoted to said draft frame to rotate about a horizontal axis at right angles to the longitudinal axis of the plow, releasable means normally holding said beam structure against rotation, said beam structure being so constructed and mounted that when released it will be automatically rotated to reverse position by forward movement of the plow and will raise said draft frame relative to the ground wheels, means for latching the draft frame in its raised position, means for releasing said latching means to permit the draft frame to move downward, and means controlled by said beam structure in accordance with whether the right or left hand plow bodies are in position for operation acting automatically as said draft frame is lowered to determine the raised or lowered position of the respective ground wheels relative to the draft frame to thereby position the proper wheel to run in a furrow and the other on unplowed ground.

11. A reversible, two-way plow having a draft frame, ground wheels for supporting said frame, said ground wheels being vertically movable relative to the frame independently of one another, a beam structure having right and left-hand plow bodies on opposite sides thereof, said beam structure being pivoted to the draft frame to rotate about a horizontal axis at right angles to the longitudinal axis of the plow, means for latching said beam structure to the draft frame, means for releasing said latching means, said beam structure, when released, being automatically turned to reverse position by the forward movement of the plow and being constructed and mounted so that, while turning, it raises the draft frame to permit the ground wheels to move downwardly relative to said frame, said latching means acting to again latch the beam structure to the frame after said beam structure is reversed, releasable means for holding the frame in raised position, and means controlled by said beam structure as the frame is again lowered for limiting the upward movement of the ground wheels relative to the draft frame, said latter means being controlled by said beam structure to alternately allow one wheel to move to the limit of its movement to position it to run on unplowed land and to arrest the other wheel in a position such that it may run in a furrow.

12. A reversible, two-way plow having a draft frame, ground wheels or supporting said frame, said ground wheels being vertically movable relative to said frame independently of each other, a beam structure carrying right and left-hand plow bodies on opposite sides thereof, said beam structure being pivoted to the draft frame to rotate about a horizontal axis at right angles to the longitudinal axis of the plow, releasable means normally holding said beam structure against rotation, said beam structure when released being automatically reversed by being turned on its pivot by the forward movement of the plow and being so constructed and mounted that it acts during its turning movement to raise the draft frame to permit the ground wheels to move downwardly relative thereto, means for latching said frame in its raised position, means for releasing said latching means to permit the frame to move downward relative to said wheels, and independent latches for each wheel for determining the relative movement between said wheels and the frame as the frame is lowered, said latches being automatically and alternately disabled by said beam structure during its reversal to thereby alternately permit one wheel to move to the limit of its movement relative to the draft frame and the other wheel to be arrested by its latch whereby one wheel may alternately run in a furrow and the other on unplowed land.

13. A reversible, two-way plow having a draft frame, ground wheels for supporting said frame, said ground wheels being vertically movable relative to said frame independently of one another, a beam structure having right-hand plow bodies on one side and left-hand plow bodies on the other side thereof, said beam structure being pivoted to the draft frame to rotate about a horizontal axis at right angles to the longitudinal axis of the plow, releasable means for latching said beam structure against rotation relative to said draft frame, said beam structure when released being rotated by the forward movement of the plow and being so constructed and mounted that it acts during such rotation to raise the draft frame to permit the ground wheels to move downwardly relative to the plow, a latch for each ground wheel for limiting its movement upward relative to the draft frame as the frame is again lowered, and means on diagonally opposite corners of said beam structure for alternately disabling said latches to alternately position one wheel to run in a furrow and the other on unplowed land.

14. A reversible plow having a draft frame, vertically movable ground wheels for supporting said frame, a beam structure carrying right and left hand plow bodies, said beam structure being pivoted to the draft frame to rotate about a horizontal axis at right angles to the longitudinal axis of the plow, releasable latching means for normally latching the beam structure against turning relative to the draft frame when the plow is in working position, said beam structure when released turning relative to said draft frame by forward movement of the plow and being so constructed and mounted that it acts during said forward movement to raise the draft frame relative to the ground wheels, latching means for latching the draft frame in raised position, and means acting, when given a certain movement, to release the latching means for the draft frame and when given another movement to release the latching means for the beam structure.

15. A plow having a beam structure carrying plow bodies, ground wheels for supporting said beam structure, said ground wheels being journaled on axles that are vertically movable relative to the beam structure so that said beam structure may be moved from working to transport position and vice versa, means for raising and lowering said beam structure, releasable means normally acting to prevent relative movement between said axles and beam structure when the latter is in raised position, said beam structure, when released, moving downward relative to said axles, latches operable to stop the relative movement between the axles and beam structure as the latter moves downward, and means for controlling the latches to control the position of the respective axles relative to the beam structure when the plow is in working position.

16. A plow having a beam structure carrying plow bodies, ground wheels for supporting said beam structure, said ground wheels being journaled on axles that are vertically movable relative to the beam structure so that the beam structure may be moved from working to transport position and vice versa, means for raising and lowering said beam structure, a link connected to each of said axles, a second link connected to each first link and to the beam structure, the joints between the links moving upward as the beam structure is lowered from transport to working position, means for blocking movement of said joints to hold the beam structure in transport position, means for releasing said blocking means, latches for arresting the joints in intermediate positions, and means for controlling the latches to control the vertical positions of the respective axles relative to the beam structure.

17. A reversible plow having a beam structure carrying right and left hand plow bodies, ground wheels for supporting said beam structure, said ground wheels being journaled on axles that are vertically movable relative to the beam structure so that the beam structure may be moved from working to transport position and vice versa, means for raising and lowering said beam structure, said beam structure being mounted so that it may be reversed to place either the right or the left hand plow bodies in position for operation, a link connected to each of said axles, a second link connected to each first link and to the beam structure, the joints between the links moving upward as the beam structure is lowered from working to transport position, means for blocking movement of said joints to hold the beam structure in transport position, means for releasing said blocking means, and latches for arresting said joints in intermediate positions, said latches being governed by said beam structure in accordance with whether the right or left hand plow bodies are in position for operation.

18. A plow having a beam structure carrying plow bodies, two ground wheels for supporting said structure, said ground wheels being mounted to swivel about vertical axes, said beam structure being vertically movable relative to the ground wheels from working to transport position and vice versa, means for raising and lowering said beam structure and connections between the ground wheels and beam structure holding the ground wheels in planes parallel to the longitudinal axis of the plow when the beam structure is in working position but freeing said wheels automatically to permit them to swivel freely about vertical axes when the beam structure is raised to transport position.

19. A plow having a beam structure carrying plow bodies, two ground wheels journaled on axles having vertical positions, said beam structure being vertically movable relative to said ground wheels from working to transport position and vice versa, means for raising and lowering said beam structure, sleeves on said beam structure in which the vertical portions of said axles are slidably and rotatably mounted, and a key and slot connection between said sleeves and axle portions acting to prevent rotation of said axles when the beam structure is in working position, said key and slot connection being constructed so that when the beam structure is raised to transport position said axles are freed to swivel freely about vertical axes.

20. A plow having a beam structure carrying plow bodies, two ground wheels for supporting the plow, axles upon which said ground wheels are journaled, said axles having vertical portions, sleeves on said beam structure in which said vertical portions are slidably and rotatably mounted, said beam structure being vertically movable relative to said ground wheels from working to transport position and vice versa, means for raising and lowering said beam structure, said vertical portions of the axles having keys positioned in slots in said sleeves when the beam structure is in working position whereby the ground wheels are held parallel to the longitudinal axis of the plow, said sleeves being raised above said keys when the beam structure is raised whereby said axles are freed to rotate about vertical axes.

21. A plow having a draft frame, ground wheels for supporting said frame, a beam structure carrying plow bodies, said beam structure being rotatably mounted on said frame, latching means normally preventing rotation of the beam structure relative to said frame, said latching means acting automatically when the resistance on said plow bodies exceeds the predetermined value to release said beam structure to permit it to rotate to turn the plows over said obstruction while the draft frame continues its forward movement without interruption.

22. A reversible plow having ground wheels, a beam structure supported by said ground wheels so that it may be reversed, said beam structure carrying right and left hand plow bodies, draft connections attached to said beam structure for pulling the plow, and means acting automatically to reverse said beam structure when the resistance on the plow bodies exceeds a predetermined value.

23. A reversible plow having a draft frame, ground wheels for supporting said frame, a beam structure carrying right and left hand plow bodies, said beam structure being mounted on said frame so that it may be reversed, draft connections for pulling the plow, and means acting automatically when the resistance on the plow bodies exceeds a predetermined value to reverse said beam structure while the draft frame continues its forward movement without interruption.

24. A reversible plow having ground wheels, a beam structure carrying right and left hand plow bodies, said beam structure being supported by said ground wheels so that it may be reversed and so that it may be raised from working to transport position, draft connections attached to the beam structure for pulling the plow, and means acting automatically to reverse said beam structure and raise it relative to the ground wheels when the resistance on the plow bodies exceeds a predetermined value.

25. A plow having a draft frame, ground wheels for supporting said frame, said frame being movable relative to said ground wheels from working to transport position, a beam structure carrying plow bodies, said beam structure being rotatably mounted on said frame, draft connections for pulling the plow, and means acting automatically when the resistance on said plow bodies exceeds a predetermined value to rotate said beam structure to turn the plows over the obstruction and to raise said draft frame while allowing the frame to move forward without interruption.

26. A reversible plow having a draft frame, ground wheels for supporting said frame, a beam structure carrying right and left hand plow bodies, said beam structure being pivoted to the draft frame to rotate about a horizontal axis at right angles to the longitudinal axis of the plow, latching means normally latching said beam structure against rotation relative to the draft frame when the plows are in working position, said latching means acting automatically to release said beam structure for rotation when the resistance on the plow bodies exceeds a predetermined value, said beam structure being constructed and mounted so that, when released, it will turn about its pivot to reverse position as the plow moves forward and will act during such turning movement to raise the draft frame relative to the ground wheels, and means for latching the draft frame in raised position.

27. A reversible plow having a draft frame, ground wheels for supporting said frame, a beam structure carrying right and left hand plow bodies, said beam structure being pivoted to the draft frame to rotate about a horizontal axis at right angles to the longitudinal axis of the plow, latching means for normally latching said beam structure to the draft frame when the plow is in working position, a manual releasing device for said latching means, said latching means including a toggle connection which when the resistance on the plow bodies exceeds a predetermined value acts to release the beam structure to permit it to rotate relative to the frame during the forward movement of the plow, said beam structure being so constructed and mounted that during said rotation it will act to raise the draft frame relative to the ground wheels, and means for latching the draft frame in its raised position.

28. A two-way plow having a reversible beam structure comprising a pair of beams having curved ends carrying right hand plows, a pair of beams having curved ends carrying left hand plows, the curved end of one beam of each pair being connected to the curved end of a beam of the other pair, and cross bars adjustably connected to the outer ends of the pairs of beams.

29. A plow having a beam structure carrying plow bodies, ground wheels supporting said beam structure, means associated with said beam structure to enable said beam structure to be raised from working to transporting position by forward movement of said plow, and latching mechanism normally restraining said raising means against operation but operable to release it, manually controlled means for releasing said latching mechanism, said latching mechanism also acting as an automatic release to free said raising means when the plow bodies strike an obstruction that puts the resistance on them in excess of a predetermined value to thereby enable said raising means to raise said beam structure.

30. A reversible two-way plow having a beam structure carrying right and left-hand plow bodies, ground wheels supporting said beam structure, each of said wheels being independently movable up and down relative to said beam structure to occupy a raised position to travel on unplowed ground or a lowered position to travel in a furrow, means whereby the beam structure may be reversed in the direction of movement of the plow to reverse the plows that are in position for operation, and means controlled by said beam structure automatically determining the raised and lowered position of the respective ground wheels in accordance with whether the right or left-hand plows are in position for operation.

31. A reversible two-way plow having two ground wheels, a beam structure supported by said ground wheels and carrying right and left-hand plow bodies, each of said ground wheels being mounted so that it may occupy a raised position to travel on unplowed ground and a lowered position to travel in a furrow, said beam structure being mounted for reversal in the direction of travel of the plow so that either said right or said left-hand plow bodies may be positioned for operation, said beam structure also being vertically movable relative to said ground wheels from transport to working position and vice versa, means operated by travel of the plow for raising said beam structure, holding means for holding the beam structure in raised position, means for releasing said holding means, and means controlled by said beam structure in accordance with whether said right or said left-hand plow bodies are in position for operation acting automatically, as said structure is lowered toward working position, to determine the raised or lowered position of the respective ground wheels relative to said beam structure in the working position of the plow to thereby position the proper wheel to run in a furrow and the other on unplowed land.

32. A plow having a beam structure carrying plow bodies, ground wheels for supporting said beam structure, said beam structure being movable relative to said ground wheels from a working to a transport position, means for releasably holding said beam structure in transport position after said structure has been moved to said position, draft connections attached to said beam structure for pulling said plow, and means acting automatically when said plow bodies strike an obstruction while in working position to quickly raise said beam structure to its releasably held transport position.

33. A plow having a draft frame, ground wheels supporting said frame, a beam structure carrying plow bodies, said beam structure being vertically movable from a working to a transport position, means for releasably holding said beam structure in transport position after said structure has been moved to said position, and means acting automatically when said plow bodies strike an obstruction while in working position and set into operation by the resistance encountered by said plow bodies to quickly raise said beam structure to its releasably held transport position while allowing said draft frame to continue its forward movement without interruption.

In testimony whereof, I have subscribed my name.

JOHN R. ORELIND.